UNITED STATES PATENT OFFICE.

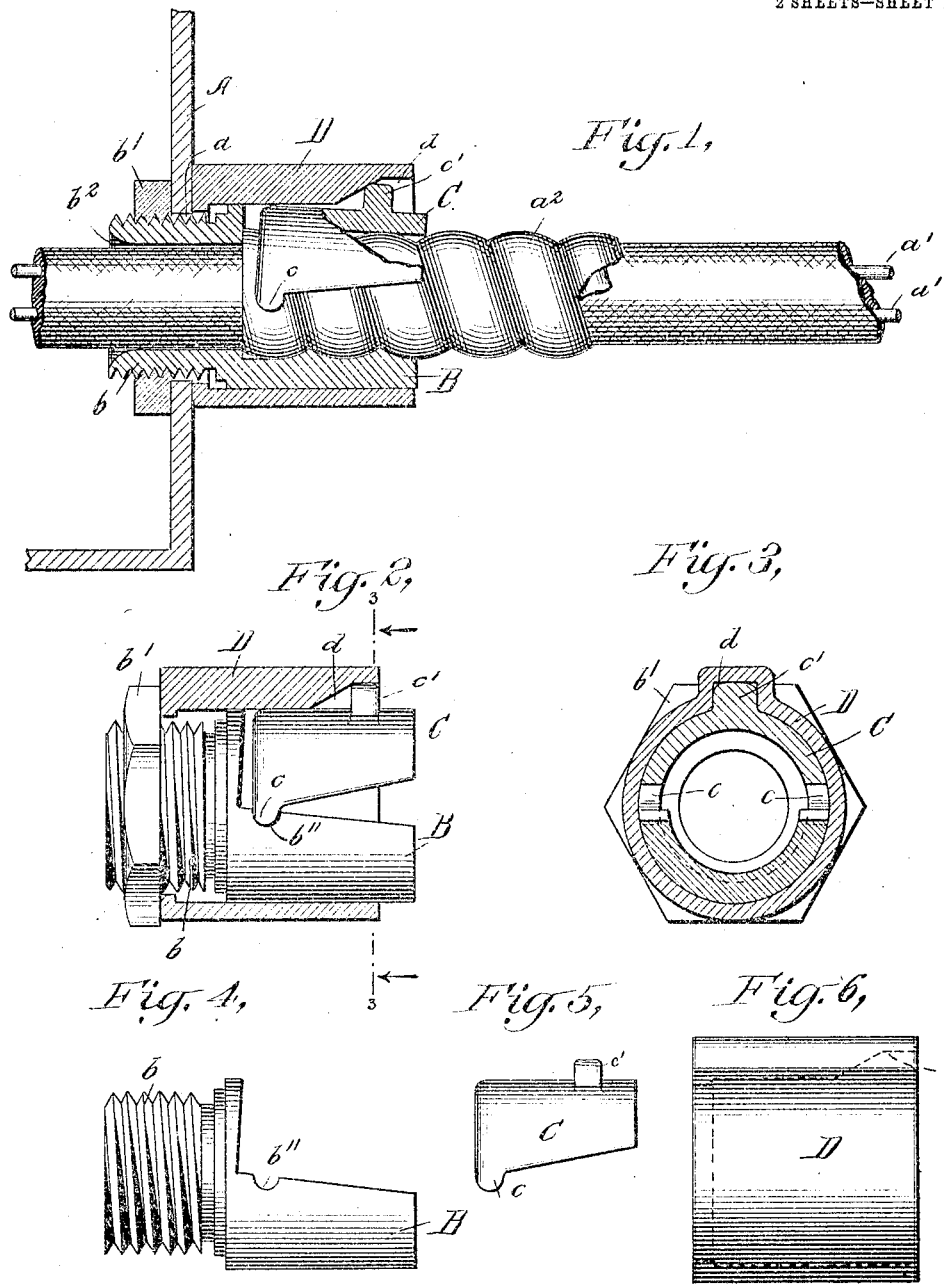

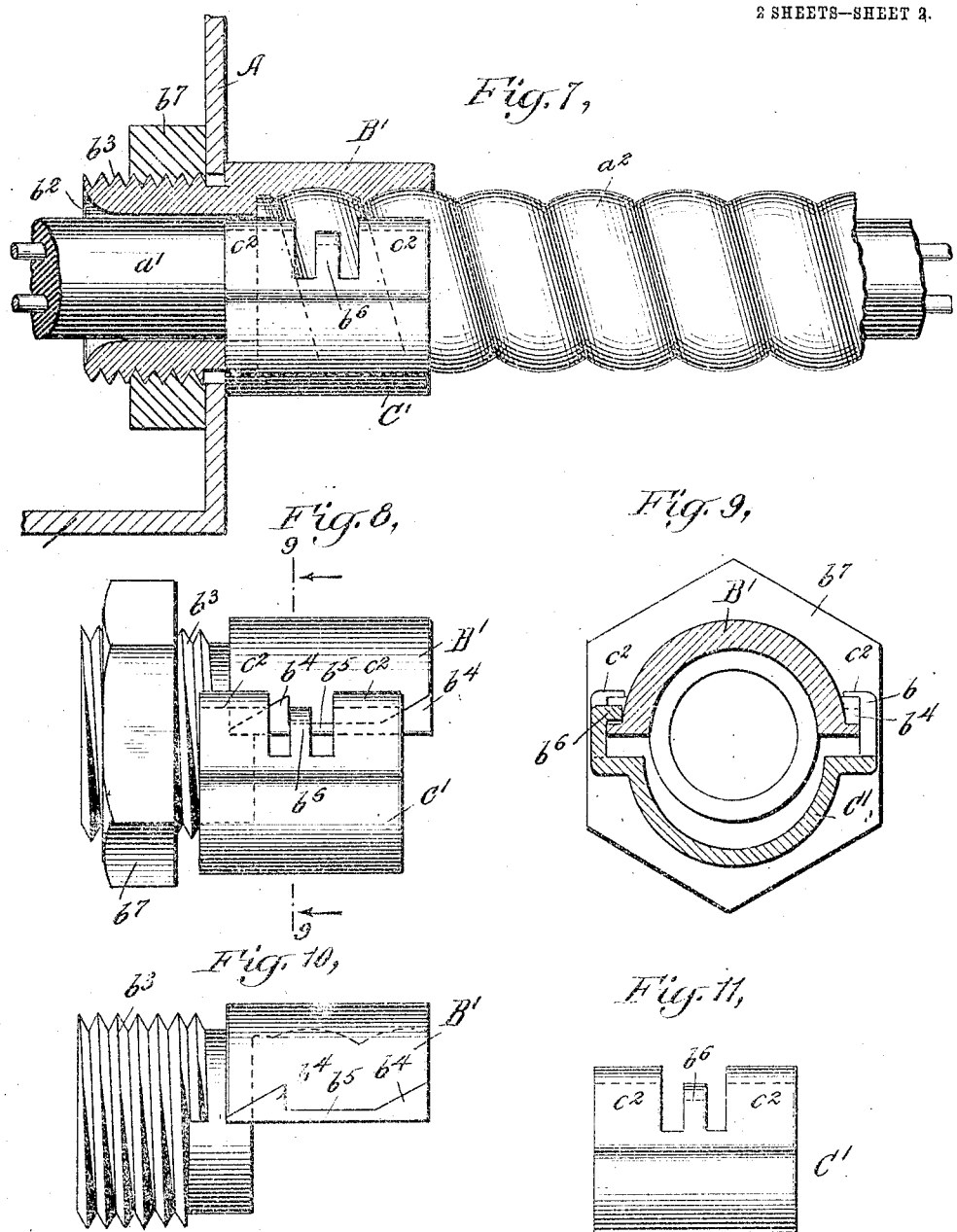

EDWIN T. GREENFIELD, OF KIAMESHA, NEW YORK.

JUNCTION-BOX.

No. 852,431.  Specification of Letters Patent.  Patented May 7, 1907.

Application filed December 29, 1905. Serial No. 293,783.

*To all whom it may concern:*

Be it known that I, EDWIN T. GREENFIELD, a citizen of the United States, residing at Kiamesha, in the county of Sullivan and State of New York, have invented certain new and useful Improvements in Junction-Boxes, (Case B,) of which the following is a specification.

This invention relates generally to junction boxes for electric wiring and specifically to means which may form part of such a construction for (detachably) securing the conductors thereto.

In carrying out the invention in an approved form, I employ a two-part locking sleeve the forward end whereof may be threaded for insertion into a suitable orifice in the wall of the box, and for the coaction therewith of a correspondingly threaded nut. The parts of said sleeve are movable relatively to each other in order to firmly grip between them the conductors or the armor or conduit, within which they are inclosed. Combined with such two-part locking sleeve I employ means whereby the securing of the threaded end of said sleeve to the wall of a box brings the parts of said sleeve positively and under considerable pressure toward each other to perform the conductor-gripping function.

The invention is illustrated in the accompanying drawings wherein I have shown two forms in which the invention may be embodied for practical use.

In these drawings Figure 1 is a sectional view of a portion of a junction box equipped with the device of my invention, Fig. 2 is a side elevation, partly in section, showing the device detached from the box, Fig. 3 is a cross-section on the line 3, 3, Fig. 2, Figs. 4 and 5 are side views illustrating the two-part locking sleeve whereby the conductors are secured to the box, Fig. 6 is a similar view illustrating a collar for moving the two parts of the locking sleeve relatively to each other, Fig. 7 is a view generally similar to Fig. 1 but illustrating a modification of the two-part locking sleeve, Fig. 8 is a side elevation illustrating this modification detached from the box, Fig. 9 is a section on the line 9, 9, Fig. 8, and Figs. 10 and 11 are side elevations illustrating the two-part locking sleeve, the parts thereof being detached.

A designates the wall of a junction box provided with an orifice $a$ preferably circular in shape. Through this orifice extend the electrical conductors $a'$ which may, if desired, take the form of a cable or may be inclosed in a suitable conduit. I have here shown such conductors in the cable form, the exterior of the cable being provided with a spirally wound metallic armor $a^2$. Coacting with the conductors, (this term being used broadly regardless of a particular form of covering,) is a two-part locking sleeve comprising the parts B, C. I have here shown the approximately semi-cylindrical part B as formed integral with the threaded sleeve $b$ designed for insertion into the orifice $a$ of the junction box and to coact, within such box, with a suitably threaded nut $b'$. The part C of the locking sleeve is here shown as provided with ears $c$ coacting with recesses $b''$ in the part B in order to give such part C movement as upon a hinge and in addition to preclude the accidental detachment of said part C. The latter is also provided with a lug or boss $c'$ the purpose of which will be presently explained.

D designates a collar loosely surrounding the two-part locking sleeve and movable longitudinally relatively thereto. The bore of said collar is provided with a cam recess $d$ coacting with the lug or boss $c'$ to force the part C toward the part B of the locking sleeve as said locking sleeve and collar are moved relatively to each other, said collar away from the box.

I have shown the bore of the threaded portion $b$ of the locking sleeve as of less diameter than that of the movable parts of the locking sleeve when the same are in the position of maximum opening, the object here being to thereby provide a shoulder against which the armor or conduit $a^2$ containing the electrical conductors may abut. I have also shown the end of said threaded portion $b$ as flaring at $b^2$, in order to prevent abrasion of the insulation of said conductors.

In operation the locking sleeve and the surrounding collar are moved relatively to each other to thereby separate the parts B, C, of said locking sleeve to the desired extent. The conductors are then inserted therein as shown in Fig. 1. If such conductors be armored as illustrated the end of such armor is brought into contact with the shoulder within said locking sleeve as above described. The threaded end $b$ of the locking sleeve is then passed through the orifice $a$ in the wall of the junction box and the nut $b'$ screwed upon said threaded end within such box. As said nut is screwed home said threaded end $b$ is drawn toward the interior of the box and the two-part locking sleeve thereby moved relatively to the collar D. The inner end thereof, as illustrated in the drawings, abuts against the external surface of the wall of the box. This brings the surface of the cam recess $d$ into coaction with the lug or boss $c'$ of the hinged member C of the locking sleeve thereby forcing said member into intimate contact with the exterior of the conductors and binding such conductors firmly in position. It will thus be seen that by a single act not only is the locking device secured to the wall of the box but the conductors are secured to the locking device. It will also be seen that either the conductors or the locking device, or both, may be as readily and easily detached, this requiring merely the unscrewing of the nut $b'$ and the removal either of the conductors or the device, or both, from the position in which they are shown in the drawings.

The locking device illustrated in Figs. 7 to 11 inclusive, differs to but slight extent from that above described, such difference concerning chiefly the means employed for moving the members of the two-part locking sleeve relatively to each other to thereby reduce the diameter of said sleeve and securely grip the exterior of the conductors. Here the external collar is dispensed with and the connection between the parts B' and C' of the locking sleeve are modified in the following manner. The member B' here shown as formed integral with the threaded portion $b^3$ of the locking sleeve, is provided with two integral cams $b^4$, $b^4$ upon each side of its exterior. The member C' of the locking sleeve instead of being connected with the member B' by a hinge joint as in the construction shown in Figs. 1 to 6, is provided at each edge with two integral lips $c^2$ passing around the cams $b^4$, the extremities of said lips coacting with the inclined surfaces of said cams. It will be apparent that as the members B', C', of said locking sleeve are moved relatively to each other the coaction of said lips and cams will cause said members to coact with each other thereby reducing the diameter of the bore of the locking sleeve and bringing the members thereof firmly into contact with the exterior of the conductors.

In order to prevent accidental displacement of the member C' of the locking sleeve, I have here shown the cams $b^4$, $b^4$ as connected by a rib $b^5$ and with this rib coacts a finger $b^6$ the extremity whereof engages with the upper surface of said rib when the members B', C' are in their position of maximum opening but leaving said members free to approach each other under the coaction of the cams $b^4$, $b^4$ and lips $c^2$, $c^2$.

The locking operation in this embodiment of the invention is effected preferably in the same manner as in the structure shown in Figs. 1 to 6 inclusive, i. e. by the operation of securing the locking sleeve to the wall of the junction box. The act of turning the nut $b^7$ upon the threaded end of the locking sleeve $b^3$ tends to draw such end toward the interior of the box. The inner end of the locking member C' abuts against the exterior of said wall so that as the threaded portion $b^3$ is drawn inwardly, the member C' being stationary, the member B' is moved relatively to the member C' and by reason of the coaction of the cams and lips carried by said members, the two are brought closer together to firmly grip the conductors extending between the same.

What I claim and desire to secure by Letters Patent is:

1. The combination with a junction box and conductors passing to the interior thereof, of a two-part locking sleeve having a cam mechanism and means for securing said sleeve to the wall of the box and simultaneously moving one of said parts relatively to the other, substantially as described.

2. The combination with a junction box and conductors passing to the interior thereof, of a two-part locking sleeve and means operated from within the box for securing said sleeve to the wall of the box and simultaneously moving the parts thereof relatively to each other, substantially as described.

3. The combination with a junction box and conductors passing to the interior thereof, of a two-part locking sleeve, a threaded extension carried by one and insertible into an orifice in the wall of the box, a nut coacting therewith inside the box and means operated by turning said nut upon said extension for moving the parts of said sleeve relatively to each other, substantially as described.

4. The combination with a junction box and conductors passing to the interior thereof, of a two-part locking sleeve, a threaded extension carried by one and insertible into an orifice in the wall of the box, a nut coacting therewith inside the box and means for moving the parts of said sleeve relatively to each other simultaneously with the securing of said locking sleeve to said box, substantially as described.

5. The combination with a junction box and conductors passing to the interior thereof, of a two-part locking sleeve, a threaded extension carried by one and insertible into an orifice in the wall of a box, a nut coacting therewith inside the box and means outside the box operated by turning said nut upon said sleeve for moving the parts of said sleeve relatively to each other, substantially as described.

6. The combination with a junction box and conductors passing to the interior thereof, of a two-part locking sleeve, one having a threaded extension insertible in an orifice in the wall of the box, a nut coacting with said threaded extension within the box and means whereby the coaction of said nut with said threaded extension will move the parts of said locking sleeve relatively to each other, substantially as described.

7. The combination with a junction box and conductors passing to the interior thereof, of a two-part locking sleeve the members whereof are connected, said locking sleeve having a threaded portion insertible into an orifice in the wall of the box, a nut coacting with said threaded portion within the box and mechanism operated by the movement of said threaded portion into the box as said nut is screwed thereon for moving said locking members toward each other, substantially as described.

8. The combination with a junction box and conductors passing to the interior thereof, of a two-part locking sleeve, a threaded part carried thereby insertible into an orifice in the wall of the box, a cam device and means for actuating the same operated by securing said threaded part to said wall, substantially as described.

9. The combination with a junction box and conductors passing to the interior thereof, of a two-part locking sleeve, a screw threaded part insertible into an orifice in the wall of the box, a nut coacting with said part within the box, a collar surrounding said two-part locking sleeve and movable relatively thereto and a cam mechanism between said collar and said sleeve, substantially as described.

10. The combination with a junction box and conductors passing to the interior thereof, of a two-part locking sleeve, a threaded part carried thereby and insertible into an orifice in the wall of the box, a nut coacting with said threaded part within the box, a loose connection between the parts of said locking sleeve and means, including a cam mechanism, for moving the parts of said sleeve toward each other simultaneously with the securing of the threaded part of said sleeve to the wall of said box, substantially as described.

This specification signed and witnessed this 27th day of December, 1905.

EDWIN T. GREENFIELD.

Witnesses:
 S. O. EDMONDS,
 I. McINTOSH.